United States Patent [19]

Dalton

[11] 4,372,798

[45] Feb. 8, 1983

[54] PROCESS FOR SECURING LAYERS OF MATERIAL TO SURFACES

[76] Inventor: Robert E. Dalton, 859 E. 169th St., South Holland, Ill. 60473

[21] Appl. No.: 128,492

[22] Filed: Mar. 10, 1980

Related U.S. Application Data

[63] Continuation of Ser. No. 905,771, May 15, 1978, abandoned.

[51] Int. Cl.³ .................... B32B 31/24; H01G 00/00
[52] U.S. Cl. ................... 156/273.1; 156/380.6; 156/579; 156/379.7; 361/220; 361/225
[58] Field of Search ............ 156/60, 272, 380, 579; 355/3 R, 3 SH, 3 CH; 361/220-222, 225, 230, 234-235; 204/164

[56] References Cited

U.S. PATENT DOCUMENTS

| | | | |
|---|---|---|---|
| 2,774,921 | 12/1956 | Walkup | 361/225 |
| 2,892,973 | 6/1959 | Straughan | 361/225 |
| 3,323,965 | 6/1967 | Hanle et al. | 156/272 |
| 3,329,549 | 7/1967 | Vilutis | 156/272 |
| 3,448,000 | 6/1969 | Paquin et al. | 156/272 |
| 3,462,909 | 8/1969 | Anderson | 156/380 |
| 3,582,730 | 6/1971 | Teston | 361/234 |
| 3,795,839 | 3/1974 | Walberg | 361/235 |

Primary Examiner—Edward C. Kimlin
Assistant Examiner—Lois E. Boland
Attorney, Agent, or Firm—William B. Mason; Penrose L. Albright; Thomas A. Stansbury

[57] ABSTRACT

An electrostatic field is created across a layer of material which has been placed on a surface with an adhesive layer therebetween to force the layer of material toward the surface, compressing the adhesive therebetween. To carry out this process, various forms of apparatus are disclosed which provide a substantially consistent electrostatic field across a film of material and a coating of adhesive to a surface to which the material is to be secured.

8 Claims, 12 Drawing Figures

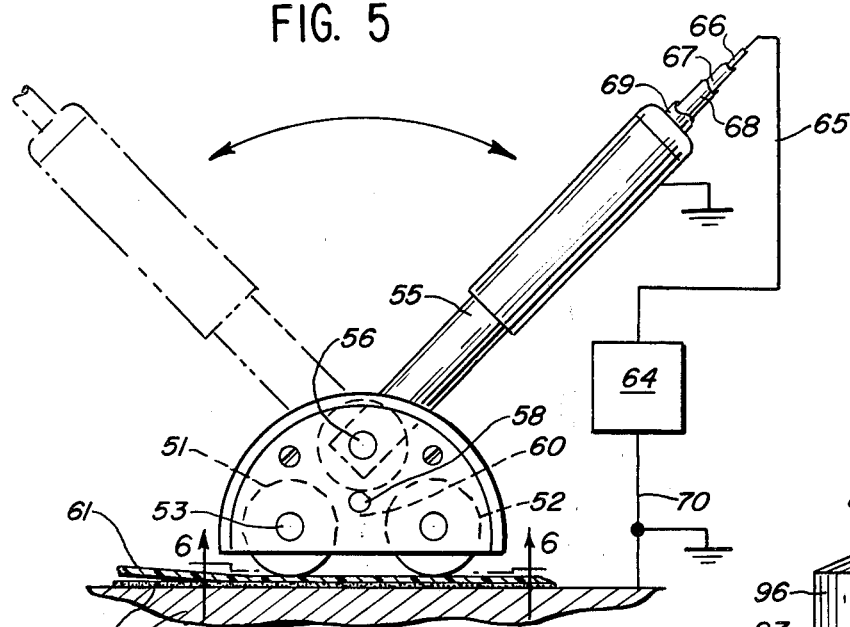
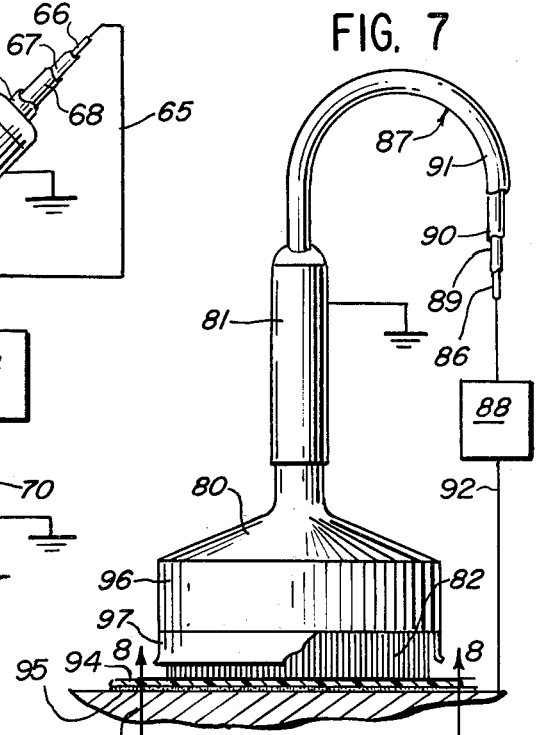
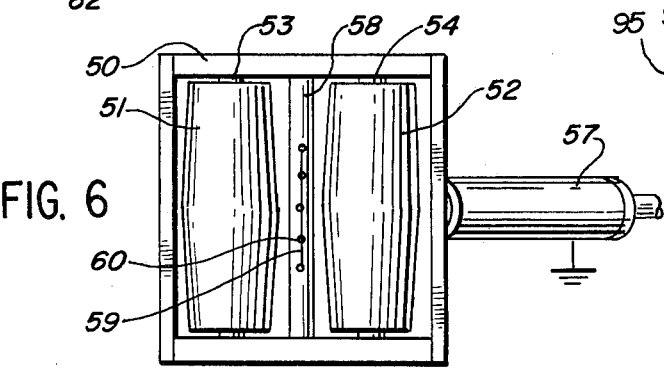
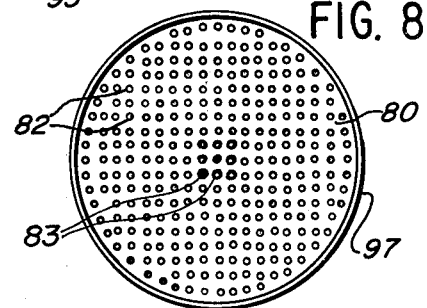
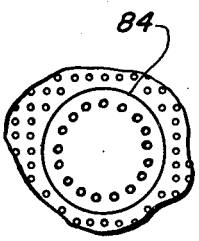
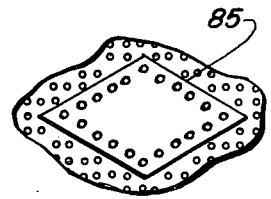
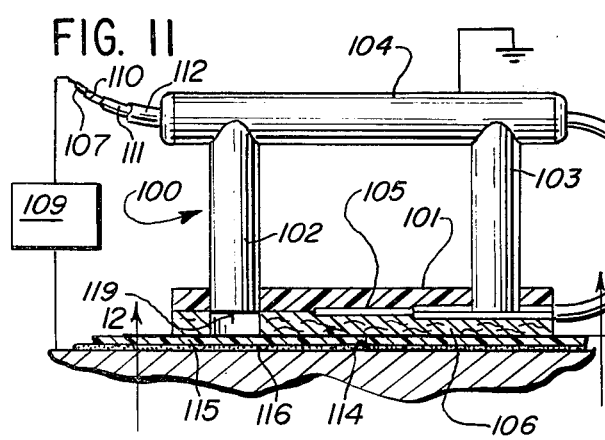
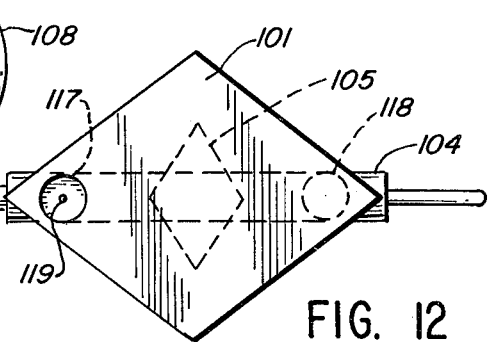

PROCESS FOR SECURING LAYERS OF MATERIAL TO SURFACES

This is a continuation of application Ser. No. 905,771, filed May 15, 1978, now abandoned.

BACKGROUND OF THE INVENTION

I Field of the Invention

The present invention relates to the securing of fleet markings, product markings, and other markings to surfaces and more particularly to securing markings to a surface by forcing them into tight contact with surfaces by the application of electrostatic fields.

II Description of the Prior Art

Commercial vehicle markings consisting of designs and lettering applied to a film material of a few mils thickness are customarily applied to the surfaces of a vehicle by applying pressure with a squeegee. A squeegee is a tool designed to fit the hand of a workman, which has a straight edge which he slides over the material to force it into contact with the surfaces of a vehicle. Markings are now used for applying signs to many other surfaces such as metal and plastic products. Utilizing squeegees for applying markings is noticeably tiring to the workman.

SUMMARY OF THE INVENTION

The present invention provides a method of applying markings to surfaces which is less tiring on the workman and provides a better bond between the markings and the surface. Instead of relying upon the physical pressure provided by the hand and arm of a workman, which becomes more and more erratic as the workman tires, a substantially constant controlled pressure is applied by establishing an electrostatic field across the marking and its adhesive to a surface to which the marking is to be secured.

It is therefore an object of the present invention to provide a new and improved method of securing markings and layers of material in general to surfaces.

Another object is to provide an electrostatic field for urging layers or films of material into close contact with surfaces in order that an adhesive interposed therebetween might tightly secure the films or layers to the surface.

An additional object is to provide apparatus in various forms for performing the aforestated process which will apply a substantially constant electrostatic field across films or layers of material to be secured to surfaces.

BRIEF DESCRIPTION OF THE DRAWINGS

Further objects and advantages will become apparent from the following detailed description taken in conjunction with the accompanying drawings in which:

FIG. 5 is an elevational drawing of another modified form of the invention;

FIG. 6 is a bottom elevational view of the embodiment of the invention illustrated in FIG. 5 taken along the lines 6—6 in FIG. 5;

FIG. 7 is an elevational drawing of a further modified embodiment of the present invention;

FIG. 8 is a bottom elevational drawing of the embodiment of the invention illustrated in FIG. 7 taken along the lines 8—8 in FIG. 7;

FIG. 9 is a partial bottom drawing of one form of the embodiment illustrated in FIG. 8;

FIG. 10 is a partial bottom drawing of another form of embodiment illustrated in FIG. 8;

FIG. 11 is a partly sectioned elevational drawing of yet another form of the invention; and FIG. 12 is a bottom elevational view of the embodiment of the invention illustrated in FIG. 11 taken along the lines 12—12.

DESCRIPTION OF THE PREFERRED EMBODIMENT

While this invention is susceptible of embodiment in many different forms, there will be described herein, in detail, embodiments of the invention with the understanding that the present disclosures are to be considered as exemplifications of the principles of the invention and are not intended to limit the invention to the embodiments illustrated. The scope of the invention will be pointed out in the appended claims.

Figure 1:
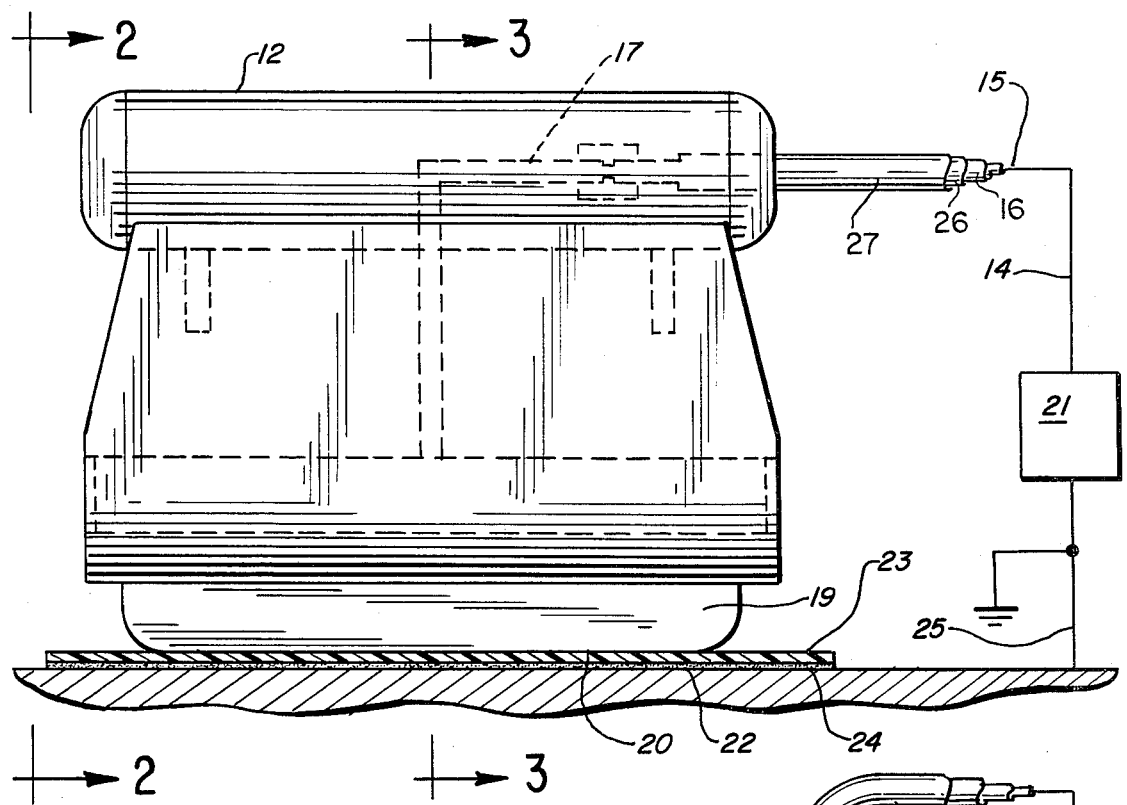
FIG. 1 is an elevation drawing of a preferred embodiment of the invention.
Figure 2:
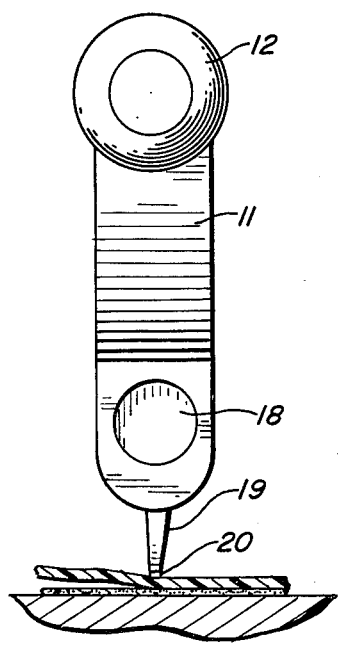
FIG. 2 is an elevation drawing of one end of the preferred embodiment illustrated in FIG. 1, taken along the lines 2—2 in FIG. 1.
Figure 3:
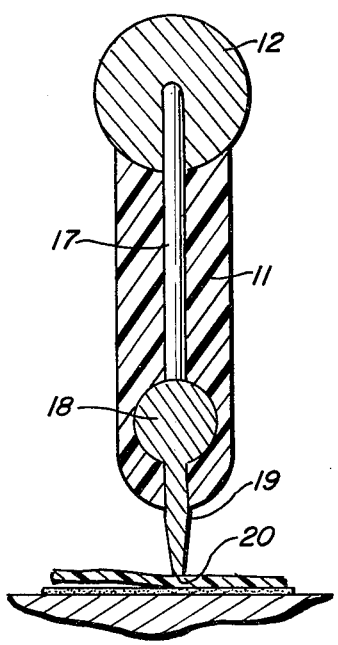
FIG. 3 is a cross-sectional drawing of the embodiment of the invention illustrated in FIG. 1 taken along the lines 3—3 in FIG. 1.

Referring to the embodiment of the invention illustrated in FIGS. 1-3, a squeegee body 11 has a handle 12 secured thereto. A coaxial cable of the RG/58U type, generally indicated at 14, has an inner conductor 15 and an insulating layer 16. The cable is secured in the handle 12 with the inner conductor 15 connected to a conductor 17 which runs through the handle 12 and down through the squeegee body 11 to a cylinder-shaped electrode 18 which is enclosed in the body 11. The conductive electrode 18 is bonded to an appendage 19 which extends outwardly from the body 11 to form an application edge 20 which is parallel to the electrode 18. The exposed portion of the appendage 19 has a coating of metallic paint.

The conductor 15 of the electrical cable 14 is connected to the negative side of a 9 kilovolt power supply, generally indicated at 21. The positive terminal of the power supply 21 is connected to a surface 22 by a conductor 25. A marking layer of material or film 23 is positioned over the surface 22 with an adhesive layer 24 therebetween. The electrostatic power supply 21 may be of any type of electrostatic power supply such as those used in electrostatic spray coating systems. These are well known to those skilled in the art. A typical 9000-volt supply is model UM 9N 1500D manufactured by the Spellman High Voltage Electronics Corporation. When the power supply is switched on, current flows through the conductors 15 and 25 to establish a 9000-voltage differential between the electrode 18 and the surface 22.

Since the appendage 19 is composed of a resistive semi-conductor covered with a metallic paint, the voltage on the metal will rise to approximately a 9000-volt differential from the surface 22. However, since the appendage 19 acts as a resistor, an operator will not get a serious shock by touching its metal surface since current flow under these conditions is limited to a few mils.

The appendage 19 provides a predetermined distance between the electrode 18 and the layer of material or film 23. The layer of material or film 23 is normally a plastic film of vinyl, polyester or acrylic, which are non-conductors. The adhesive 24 is usually applied to the film 23 prior to locating it on the surface 22. The film 23 normally ranges between 2 and 4 mils in thickness. Negatively-charged particles form in and around the edge 20 of the appendage 19 and positively-charged particles form in the surface 22 to create a strong electrostatic field across the film 23 and adhesive 24. The attraction for the positively-charged particles force the appendage edge 20 toward the surface 22 as the operator slides the edge 20 across the film 23. Therefore the operator may utilize the electrostatic squeegee in a similar manner to previous squeegee, but he no longer is required to assert physical pressure to bring the film 23 in close securing contact with the surface 22. The force of the electrostatic field will provide a resulting bond which is equivalent or greater than the normal bond produced by a workman utilizing physical pressure. The adhesive 24 may be of any pressure-sensitive or pressure-activated adhesive material well known to those skilled in the art. Adhesion test made with a keel tester on a 100° keel strength test, pulled at a rate of approximately 12" per minute, produced adhesion values of 72 ounces per inch on a 4 mil vinyl film, a range of 60 to 80 ozs. per inch on three 2 mil vinyl films, each of different manufacture, and a 60 ozs. per inch adhesive value for a 2 mil polyester film. A value of 50 ozs. per inch is considered a good adhesion for application using a standard squeegee and manual pressure. No manual pressure was applied during the aforestated test of the electrostatic squeegee. Therefore, the present invention provides equal or better adhesion to that obtainable by the use of manual pressure.

A braided flexible metal shield 26 in the cable 44 surrounds the insulating layer 16 and it is covered by an outer layer of insulation 27. The metal shield 26 electrically connects the handle 12 to the positive terminal of the power supply 21 and thus to ground to prevent possible shock to the operator.

Figure 4:
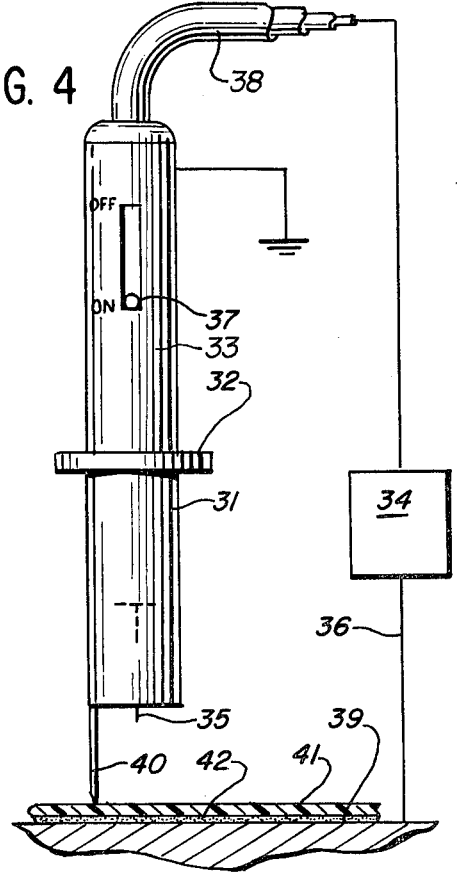
FIG. 4 is an elevational drawing of a modified form of the invention.

Turning now to FIG. 4, a cylindrical body of non-conductive material such as plastic 31 is secured to a grounded metal handle 32. A shield 33 is secured to the handle 32. A coaxial cable 38, is connected to the negative terminal of a power supply generally indicated at 34, and to a needlepoint electrode 35 mounted in the non-conductive body 31. The positive terminal of the power supply is connected by a conductor 36 to a surface 39 on which is to be mounted a film.

A feeler 40 is constructed of a non-conductive material such as plastic and rigidly mounted to the body 31. When the power supply 34 and the switch 37 are turned on, a 9000-volt differential is created between the surface 39 and the electrode 35. The negatively-charged particles form at the electrode 35 and form on the surface of a layer of material or film 41 thereby creating an electrostatic field between the upper surface of the film 41 and the surface 39, crossing the film 41 and an adhesive 42 interposed therebetween.

As the operator moves the ionizing tool over the film 41, utilizing the feeler 40 as a distance guide, a substantially uniform field is provided across the film 41 and the adhesive 42 forcing the film into tightly bonded relationship with the surface 39.

Turning now to FIGS. 5 and 6, as electrostatic applicator has a housing 50 with a pair of rollers 51 and 52 rotatably mounted on respective shafts 53 and 54, which are rotatably secured in the housing 50. A plastic arm 55 is rotatably mounted on a shaft 56 secured in the housing 50. The arm 55 is constructed of a non-conductive material such as plastic. A metal handle 57 is secured over the arm 55. An internal beam 58 of non-conductive material such as plastic is secured in the housing 50 between and parallel to the rollers 51 and 52. The beam 58 has enclosed therein a conductor 59 which is electrically connected to a series of needlepoint electrodes generally indicated at 60. The needlepoint electrodes 60 point towards a layer of marking material or film 61, placed over a surface 62 with a layer of adhesive 63 interposed therebetween. The negative terminal of a power supply 64 is connected by a coaxial cable 65 having an inner conductor 66, an insulation layer 67, a metal shield 68 surrounding the insulation layer 67 and an outer insulation layer 69. The metal handle is connected to the conducting shield 68 which is connected to the positive terminal of the power supply 64. A positive terminal of the power supply 64 is connected by a conductor, generally indicated at 70, to the suface 63. The inner conductor 66 of the coaxial cable 65 passes through the handle 55 and is connected to the beam internal conductor 59.

Thus, as an operator grasps the handle 57 and places the rollers against the film 61, that has been located on the surface 62, and the power supply has been turned on, a constant electrostatic field is created across the film 61 and the adhesive 63 to urge it into tightly bonding contact with the surface 62. The rollers are utilized merely to provide dimensional control between the electrodes 60 and the film 61; however if there should be any need to apply physical pressure, this may be provided by the operator by physically bearing down through the handle on the rollers. However, such action would only be required in the case of an emergency such as a power failure.

Another form of film applicator is illustrated in FIGS. 7-10 which has a non-conductive body 80 which may be made of such materials as wood or plastic. A conductive handle 81 is secured over the body 80. A series of bristles, which may be made of stiff nylon or similar material, are mounted to the body 80 as generally indicated at 82 to form a brush. A few of these bristles in the center of the brush are coated with semi-conductive material as generally indicated at 83. The semi-conductive bristles may form any of a number of desired patterns as generally illustrated at 84 and 85. These bristles are connected to the inner conductor 86 of a coaxial cable generally indicated at 87, which in turn is connected to the negative terminal of a power supply 88. The coaxial cable 87 has an insulating layer 89, and an outer covering of insulating material 91. The shield 90 is connected to the handle 81 and to the positive terminal of the power supply 88 and thus to ground. The power supply 88 is connected by a conductor generally indicated at 92 to a surface 93 upon which is to be secured a layer of material or film 94 by an adhesive layer 95. In this form of the invention, the applicator is utilized as if it was a brush. As the workman brushes the layer of material or film 94 into place, the ionizing bristles 83, similarly to the appendage 19 of the applicator illustrated in FIGS. 1-3, create a layer of negatively-charged particles over the film 94. This provides a strong electrostatic field across film 94 and adhesive 95 to urge the film in tight bonding position with the surface 93. The brush applicator is particularly useful on irregular surfaces such as covering rivet heads on the panels of a commercial vehicle.

The body 80 may have a metal ring 96 with a sharp lower edge 97 which is connected to the conductive handle 81 by an internal conductor, not shown. This provides a grounded ionizer. If the film or layer of material 94 has metal particles enclosed therein, it will become charged from the field. The grounded sharp edge 97 tends to remove such charge as the brush is moved along the film 94.

Turning now to FIGS. 11 and 12, an applicator is illustrated which has a frame generally indicated at 100 consisting of a diamondshaped plate 101, a pair of stanchions 102 and 103, rigidly secured thereto, and a handle 104. The plate 101 and the stanchions 102 and 103 are constructed of a non-conducting material such as plastic, and the handle 104 is constructed of conducting material such as metal. A conductor plate 105 is secured to the non-conductive plate 101. The plate 105 can be a semi-conductor. It is covered by a felt pad 106 secured to the plate 101 and is connected by a center conductor 107 of a coaxial cable 108 in the negative terminal of a 9000-volt electrostatic power supply 109. The coaxial cable 108 has an insulating layer 110, a flexible conductive shield 111, and an outside insulating layer of cover 112. The shield 111 is connected to handle 104 and the positive terminal of the power supply 109, thus grounding it.

The positive terminal of the power supply 109 is connected to a surface 114 to which is to be secured a layer of material or film 115 by an adhesive 116. Thus, an electrostatic field is produced from the electrode plate 105 across the felt pad 106, the film 115, and the adhesive 116 to the surface 114. The pointed design of the pad 106, backed up by the plate 101, forces air from beneath the film 115 as the applicator is run over the surface of the film by creating a snow plow effect. Thus, the felt pad is urged down upon the film 115 bringing the adhesive 116 into a tight bonding relationship between the film 115 and the surface 114. An apperture 117 may be provided in the felt pad 106 to expose a needlepoint electrode 119 which is mounted in the stanchion 102. This needlepoint electrode, when utilized, is connected to the metal handle 104 thereby grounding it to the positive side of the power supply. Thus the electrode 119 provides a grounded ionizing electrode which aids in removing charges from metal particles in the layer of material or film 115.

Those skilled in the art will recognize that the polarity of the power supplies may be reversed, thus forming positively-charged particles above the film and negatively-charged particles in the surface to which the film is to be attached. Also, they will recognize that, although the layer of material or film to be attached is normally a non-conductor, semi-conductors can be secured by this method. There will be a current flow through a semi-conducting film, but, as long as the resistance of the film is sufficiently high to maintain a significant voltage differential across the resistive film, an electrostatic field will exist and the film will be urged towards the surface. When a semi-conducting film is to be applied to a surface, it may be desirable to use a power supply producing a greater voltage differential. While an approximate 10,000-volt supply is suitable for use as part of the applicators herein described for films of 2 to 4 mils in thickness, thickened materials may be applied by this method by increasing the voltage supplied by the power supply. Thus, materials of considerable thickness can be applied by the process which is the subject of the present invention.

I claim:

1. In the process for securing pressure-applied adhesive-coated film to a surface wherein an adhesive-coated film is positioned on a surface with the adhesive contacting the surface and pressure is applied to the film by a tool having an appendage for contacting the film while sliding thereon, the improvement which comprises simultaneously applying an electrostatic field across the film and adhesive from an electrode located in the tool through the tool appendage, which appendage is composed for a resistive semi-conductor, to the surface.

2. The improvement in the process for securing adhesive-coated film to a surface, as specified in claim 1, wherein said electrostatic field is maintained substantially constant.

3. The improvement in the process for securing adhesive-coated film to a surface as specified in claim 1, wherein said electrostatic field has an electrical potential of approximately 10 kilovolts.

4. The improvement in the process for securing adhesive-coated film to a surface as specified in claim 3, wherein said applied electrostatic field is held substantially constant.

5. The improvement in the process for securing adhesive-coated film to a surface as specified in claim 3, wherein said film is vinyl.

6. The improvement in the process for securing adhesive-coated film to a surface as specified in claim 1, wherein said film is polyester.

7. The improvement in the process for securing adhesive-coated film to a surface as specified in claim 1, wherein said film is acrylic.

8. In the process for securing pressure-applied markings to a surface wherein an adhesive-coated sheet of film of a predetermined shape and size, having graphics thereon, is positioned on a surface with an adhesive adjacent the surface and pressure is applied to the film by a tool having an appendage for contacting the film while sliding thereon, the improvement which comprises simultaneously applying an electrostatic field across the film and adhesive from an electrode located in the tool through the tool appendage, which appendage is composed of a resistive semi-conductor, to the surface, whereby said sheet of film is permanently bonded to said surface.

* * * * *